UNITED STATES PATENT OFFICE.

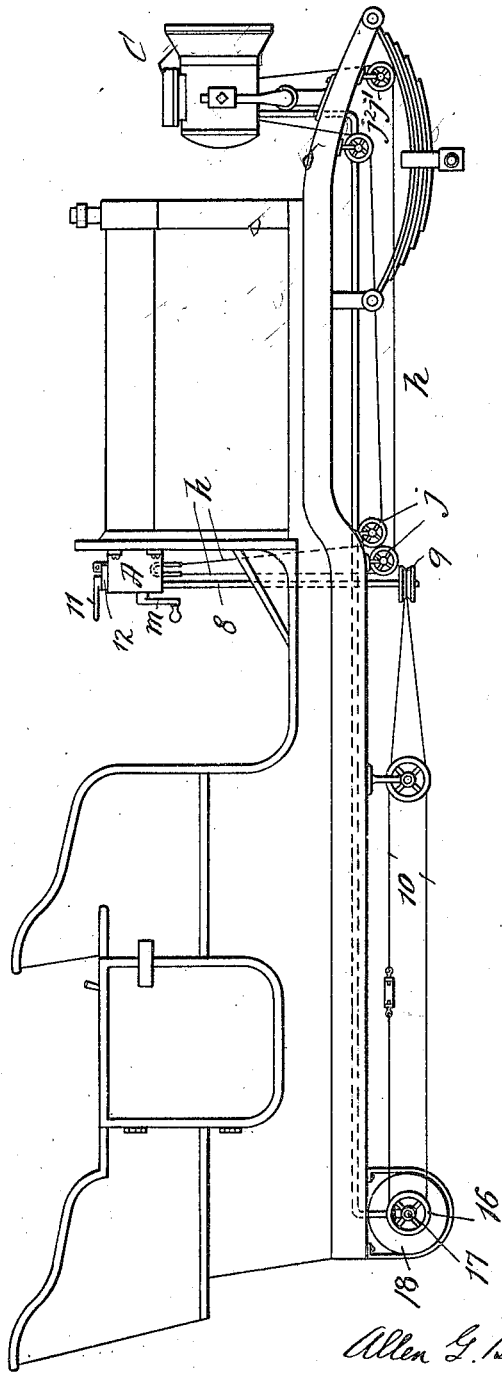

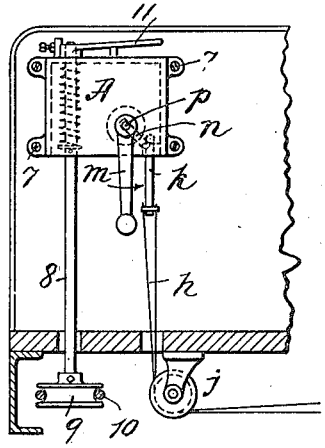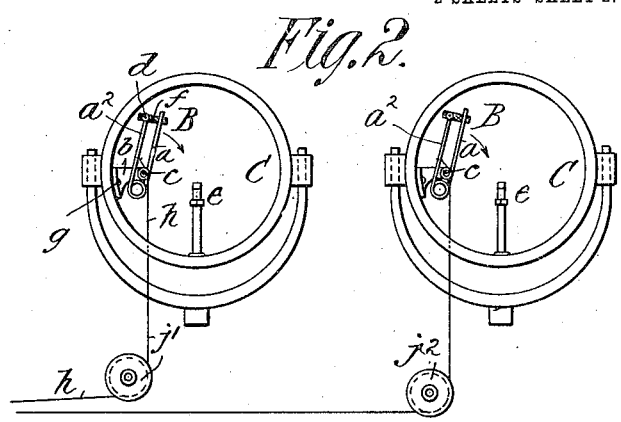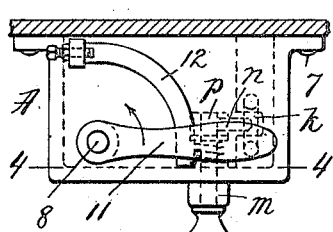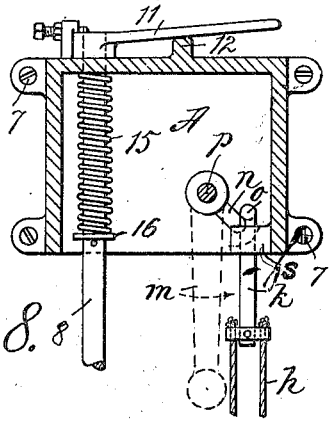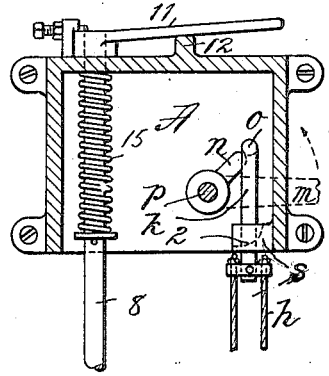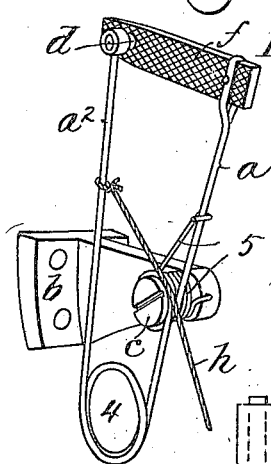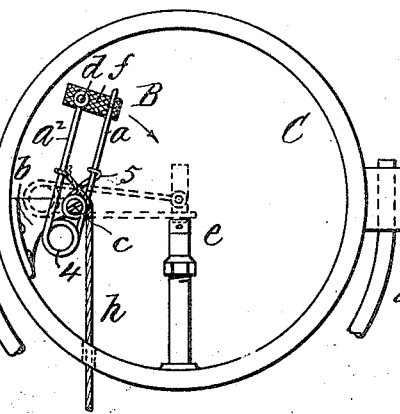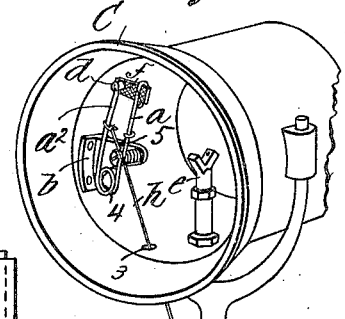

ALLEN G. BLACK, OF SPRINGFIELD, MASSACHUSETTS.

GAS CONTROLLING AND LIGHTING APPARATUS FOR AUTOMOBILES.

1,023,004.  Specification of Letters Patent.  Patented Apr. 9, 1912.

Application filed February 17, 1911. Serial No. 609,225.

*To all whom it may concern:*

Be it known that I, ALLEN G. BLACK, a citizen of the United States of America, and resident of Springfield, in the county of Hampden and State of Massachusetts, have invented certain new and useful Improvements in Gas Controlling and Lighting Apparatuses for Automobiles, of which the following is a full, clear, and exact description.

This invention relates to a lighting device for automobile lamps, the object being to provide a means which is operable from the driver's seat, for ignition of the gas issuing from the burners of the lamps.

Another object is to arrange the lighting device so that it will not lessen the brilliancy of the light by covering the reflector. And a further object is to make a practicable and convenient combination of the controller operating the ignition device and controller for the gas tank valve operating device in one appliance or equipment on the dashboard of an automobile.

The invention is fully described in conjunction with the accompanying drawings and is set forth in the claims.

In the drawings:—Figure 1 is a side elevation of an automobile having my improved devices thereon. Fig. 2 is a diagrammatic view comprising in part a front elevation of lamps, and a sectional elevation transversely of the automobile just in rear of the operating mechanism on the dashboard, for the lighting devices. Fig. 3 is a plan view of the controlling mechanism located on the dashboard of an automobile; Fig. 4 is a cross section of same taken on line 4—4, Fig. 3, showing the controlling crank in normal, vertical, position. Fig. 5 is a view similar to Fig. 4, but showing the controlling crank moved from a vertical to a horizontal position, as in the act of operating the ignition devices. Fig. 6 is an enlarged front view of one of the lamps comprised in the lighting system. Fig. 7 is a perspective view of the gas lighting device, showing it in its relation to a lamp; and Fig. 8 is a perspective view of the lighting device on a larger scale.

Similar characters of reference indicate corresponding parts in all of the views.

Referring to the drawings, A designates the controller for the gas lighters B B of the lamps C, C, which are understood to be at the head of the machine or in their various places as usual. The gas lighter is comprised of a coiled and return bent spring rod which has one leg $a$ thereof pivoted at $c$ to the bracket $b$. The other leg $a^2$ carries an igniting member which may be cerium or other pyrophoric substance, and which has a rubbing coaction against the file like member $f$ rigidly carried at the extremity of the rod or leg $a$, and relative to which legs $a$, $a^2$ may move, as indicated in Fig. 6. The bracket $b$ is held firmly against the side of the lamp C by means of the screws $g$ $g$. A spring 5 is in engagement with the leg $a$ of the lighter B for the purpose of returning the said lighter B to its original position after the gas is ignited. The cord $h$ is attached to the leg $a^2$ above the level of the pivot $c$ and at a distance from the igniting member $d$ to allow an easy movement of the lighter. The cord $h$ is guided by a small wheel or roller held by pivot screw at $c$ whence it passes downward through an aperture in the metallic casing of the lamp to the pulley J', whence it is guided by pulley wheel $j$ vertically upward to the vertical slide bar $k$. Said slide bar $k$ passes through the containing box of controller A from lower side. The containing box has an internally located apertured lug $s$ through which the slide bar is guided in its vertical movements. The said block has a recess 2 for receiving the extremity of the lever $n$ carried as a rigid arm of an operating shaft $p$, and which arm engages the transverse member $o$ provided at the upper extremity of the slide bar $k$ in such a position as to fall directly across the recess 2 when the slide bar $k$ is in its normal lowered position.

The shaft $p$ for operating the slide $k$ is operated by crank arm $m$, the lever $n$ being attached to said shaft at a proper angle thereto to conduce to efficiency of operation of the device. By the movement of said crank $m$ from a vertical to an upwardly horizontal position, the lever $n$ engages the pin $o$ lifting the slide bar $k$ and drawing with it the attached cord which causes the lighter B (Fig. 6) to be swung from its normal, approximately vertical to a horizontal position, bringing it in engagement with the upper extremity of burner $e$ of the lamp C. The burner usually used for acetylene gas is of the bifurcated form, and the member $a$ is brought to a stop by coming down into the crotch of the burner top. By a further upward movement of the crank $m$ the leg $a^2$ of the lighter B is drawn by cord $h$ to a position in close proximity to leg $a$; and a continued upward movement of crank $m$ will release the pin or member $o$ from its engagement, and the coil spring 4 being much stronger than the spring 5,—which is also comprised in the lighter B,—the leg $a^2$ moves rapidly away from leg $a$ and the spark or flame producing material $c$ engaging with the file like member $f$ causes a spark which ignites the gas issuing from the burner $e$ of lamp C. Simultaneously with the action of the spring 4 of the lighter B, the spring 5 causes the lighter to be swung away from the burner to its normal position where in no way does it destroy the brilliancy of the light.

The controlling box is fastened to the dashboard of the automobile by any suitable means such as screws. The case or container for the controller mounted on the dash-board as stated, is also included in means which in addition to operating in conjunction with the gas lighting devices for the lamps as described, operates in conjunction with the appliances for controlling the supply of gas to the lamps; and in the drawings, 8 represents a vertical rod which passes and is guided through the controller box, on the lower extremity of which a pulley wheel is horizontally mounted, and around which the endless cord or wire 10 passes. This endless flexible connection 10 has an engagement around a pulley 16 which is fixed on the rotative stem 17 of the valve for the gas tank 18, having a position remote from the lamps, and which is pipe-connected with the burner or burners of the lamps, so that when the endless cord is moved the valve will be more or less opened as desired, or fully closed. On the upper extremity of the vertical rod, above the top of the box, is mounted a lever 11 which engages with an upstanding rib 12, the object of which is to frictionally hold the lever at any position where it may be placed. A comparatively heavy spring 15 is placed around the vertical rod 8 inside the controller box, the upper end of said spring bearing against the top wall of the box 8, while the lower extremity is in engagement with a shoulder 16. If lever 11 be swung from its normal position, the cord 10, passing about the pulley wheel at the lower extremity of the rod 8, operates the gas tank valve with which the cord 10 also engages.

From the foregoing description it will be seen that simple and efficient means are herein provided for accomplishing all the objects of the invention.

It is apparent that by providing a means operable from the driver's seat for the lighting of the lamps, that much time and trouble may be saved; and in conjunction with the controlling device for the gas tank valve which is operated from the same controller, danger of damage to the lamps from explosions occasioned by the escape of a large amount of gas between the time of opening the valve and the ignition of the gas will be avoided.

I claim:—

1. The combination with a burner, of a support to one side of the burner and a lighting device consisting of a spring wire, the middle portion of which is made into a coil, while its extremities are extended therefrom in approximately parallel legs, one thereof having an abrading piece and the other a coöperative igniting piece, one of said legs being pivotally mounted on said support and having a retracting spring applied in relation thereto, and a cord having a draft connection with the other one of said legs.

2. The combination with a burner, of a support to one side of the burner and a lighting device consisting of a spring wire, the middle portion of which is made into a coil, while its extremities are extended therefrom in approximately parallel legs, one thereof having an abrading piece and the other a coöperative igniting piece, one of said legs being pivotally mounted on said support and having a retracting spring applied in relation thereto, a cord having a draft connection with the other one of said legs, and a slidable bar having a transverse member, to which bar said cord is connected, the cord being intermediately thereof sheave guided, and a shaft having a rotating handle, and having a lever-like projection for successively engaging, under rotations of such shaft, the transverse member of said bar.

Signed by me at Springfield, Mass., in presence of two subscribing witnesses.

ALLEN G. BLACK.

Witnesses:
Wm. S. Bellows,
G. R. Driscoll.